Patented July 19, 1949

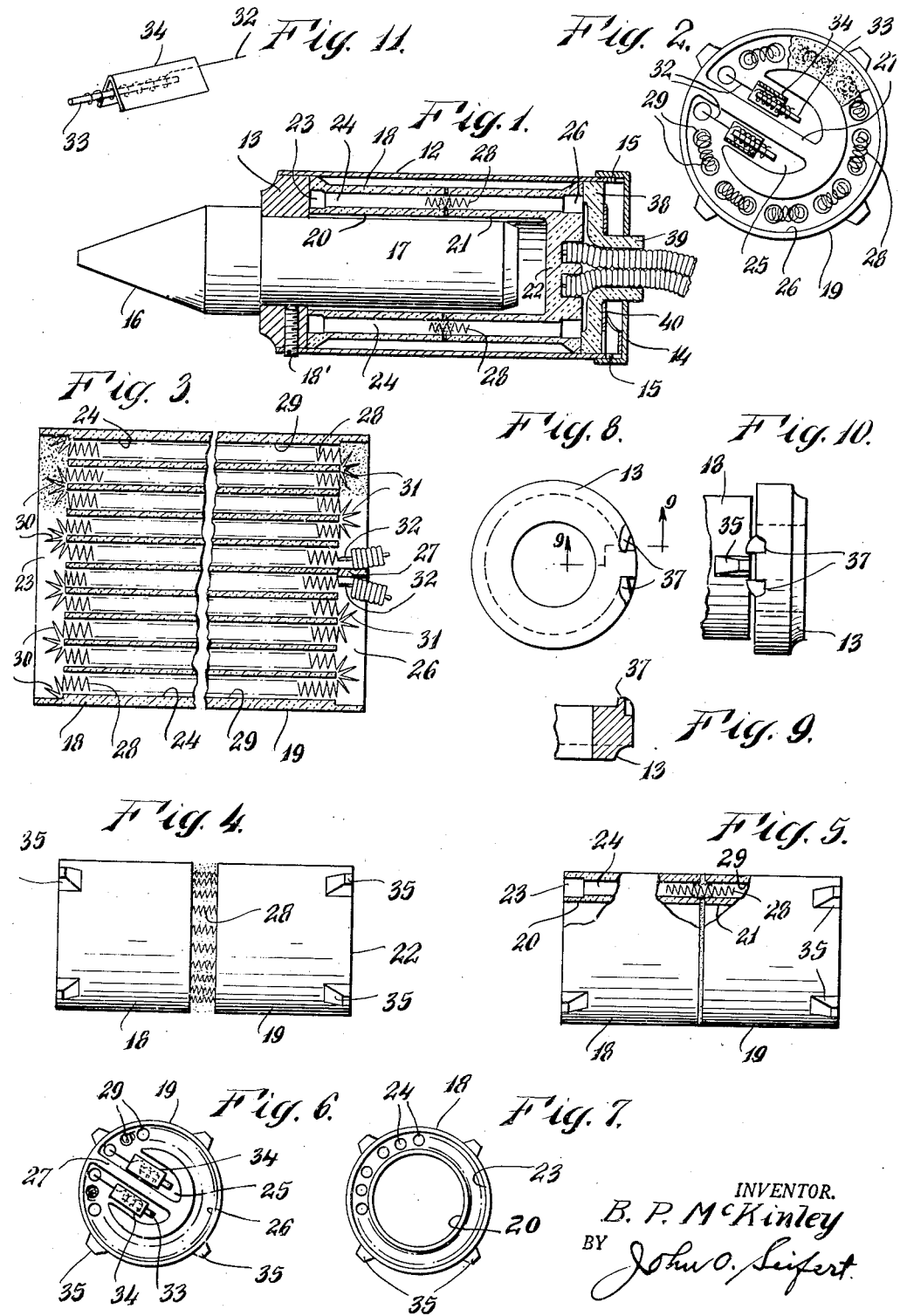

2,476,613

UNITED STATES PATENT OFFICE 2,476,613

ELECTRIC HEATING UNIT

Benjamin P. McKinley, Manatee County, Fla., assignor to McKinley-Mockenhaupt Co., Chicago, Ill., a corporation of Illinois Application March 29, 1946, Serial No. 658,079

5 Claims. (Cl. 201—64)

This invention relates to electric soldering irons wherein the soldering bit is arranged at the end of a shank and the shank extended into one end of and supported in a tubular shell or housing with the bit extending exterior of the shell, and the shell carrying an electric heating unit therein in surrounding relation to and heating the bit shank and the heat of the bit shank transmitted to and heating the bit, the present application being a continuation in part of subject-matter divided out from my co-pending application Serial No. 522,592, granted March 4, 1947, as Patent No. 2,416,936.

In electrically heated soldering irons of this character in order that the bit shank will be heated to a sufficiently high temperature to transmit the heat thereof to and heat and maintain the bit heated at an effective soldering temperature under load, the bit shank is made of considerable bulk and length with the object of heating the bit shank to and maintaining it at a sufficiently high temperature to assure transferring the heat thereof to and maintaining the bit tip at a soldering temperature. This increase in the size of the bit shank necessitates an increase in the size of the other parts of the iron and an increase of the weight thereof with the result the user of the soldering iron becomes quickly fatigued and requires frequent rest periods. Furthermore, the bit shank and enclosing shell being of relative large size there is considerable dissipation by radiation of the generated heat with the result that electric heating units permissible for use in irons of this character are not of a capacity to generate a sufficient amount of heat to heat and maintain the soldering bit at an effective soldering temperature and it is necessary to frequently stop the soldering operation to permit the soldering bit to recover its soldering temperature.

It is an object of the invention to provide an improved construction and arrangement of soldering iron of this character to reduce the size and weight thereof, whereby the soldering iron may be used for a considerable length of time without the user becoming fatigued and make it permissible to generate sufficient heat to heat and maintain the soldering bit at an effective soldering temperature under load.

It is another object of the invention to provide in soldering irons of this character an improved construction and arrangement of electric heating unit of relatively small size having the capacity to generate sufficient heat to heat the bit shank to and maintain it at a sufficiently high temperature to assure transmitting the heat thereof to and maintain the bit tip at an effective soldering temperature.

In soldering irons of this character the heating unit is carried in a tubular shell or housing and comprises a body of electric insulating and thermal conducting material, and an electric resistor carried by said body. The body has an outer diameter substantially equal to the internal diameter of the shell or housing and when the heating unit is mounted therein the body is in close proximity to the side wall of the shell with the result that the heat generated by the resistor member or element is transferred from the body to and heats the shell from which the heat is radiated and dissipated into the atmosphere. Furthermore, the resistor carrying body is loosely mounted in the shell and electric current conductors are connected to the resistor element and extended from the shell through a handle connected to the shell. As the soldering iron is manipulated by the handle there is a tendency to exert a force on the conductors to impart rotary movement to the heating unit in the shell and due to the resistance of the heating unit to such movement a force is applied to the connections of the conductors with the resistor element which will break such connections.

It is a further object of the invention to provide in an electric heating unit for electric soldering irons of this character an improved constructed and arranged carrier body for an electric resistor element having an outer diameter less than the internal diameter of the shell with projections extended outwardly therefrom to have point contact with and support the resistor carrier in the shell in spaced relation thereto and thus minimize the transmitting of heat from the carrier for the resistor to the shell, and one or more of said projections adapted to co-operate with abutments arranged in the shell or housing to hold the heating unit against rotation.

In an electric soldering iron of this character in order to provide a heating unit of relatively small size but having a capacity to generate sufficient heat to heat and maintain the soldering bit at an effective soldering temperature, the body of electric insulating and thermal conducting material carrying the resistor member is elongated and of relatively small diameter with a bore extending axially into one end for the engagement of the shank of the soldering bit and closed at the opposite end, and has a series of passages or bores circumferentially spaced about and extending longitudinally through the wall of said body and in which the resistor member is arranged. The carrier body for the resistor member consists of molded ceramic or refractory material and due to the thinness of the wall about the bore in the body for the resistor member and arranging the same with the circumferentially spaced passages for engagement of the resistor member, and thus making it impracticable to mould the same in one piece.

It is another object of the invention to provide an improved carrier body for the resistor member or element of the heating unit consisting of two moulded sections, one section having an axial bore therethrough and the other section having an axial bore extended into one end and closed at the opposite end and both sections having circumferentially spaced passages or bores extending longitudinally therethrough, and said body sections assembled in endwise relation with the one end of the section having the axial bore therethrough in abutting relation to the end of the other section into which the axial bore is extended, and the resistor element or member in said condition of the body sections passed successively through the passages and about the ends of the separating walls between the passages with the terminals of said element extended through juxtaposed passages at the closed end of the one section adapted for connection of electric conductors, and the body sections secured together into a unitary structure in said condition by a ceramic or refractory material interposed between the adjacent ends of the body sections with portions thereof engaging in the passages in embedding relation with the resistor element or member and anchoring the same within the passages.

Other objects and advantages of the invention will be apparent from the specification.

In the drawing accompanying and forming a part of this application there is shown a soldering iron embodying the invention, wherein Figure 1 is a side elevational view showing the soldering bit carrying housing and heating unit carried thereby in longitudinal section.

Figure 2 is an end elevation of an electric heating unit for the soldering bit looking at the right of the heating unit as shown in Figure 1.

Figure 3 is a longitudinal sectional view, on an enlarged scale, to show the manner of arranging the resistor member in the passages and the engagement thereof about the ends of the separating walls between the passages of the resistor carrying body of the heating unit.

Figure 4 is a side elevation of the heating unit showing the sections of the carrier body for the resistor member spread apart preparatory to filling the ceramic or refractory material in a plastic state between the adjacent ends of the body sections to secure them together.

Figure 5 is a view similar to 4, partly in section, but showing the body sections brought together with a portion of the ceramic or refractory material for securing the sections together disposed between the ends of the sections and showing the manner of portions of such material engaging in the body passages in embedding relation to the resistor member.

Figure 6 is an end elevation of the resistor carrying body looking at the right hand end of Figures 1, 4 and 5.

Figure 7 is an end elevation of the resistor carrying body looking at the left hand end of Figures 1, 4 and 5.

Figure 8 is a view of a bushing closing one end of the shell or housing looking at the inner side thereof and showing the same arranged with opposed abutments for engagement of an outwardly extending projection of the body.

Figure 9 is a sectional view taken on the line 9—9 of Figure 8.

Figure 10 is a side elevational view of the bushing in the shell and showing a projection on the resistor carrying body engaged between the pair of abutments arranged on the bushing, and Figure 11 is a perspective view showing means and the manner of electrically connecting the terminals of the resistor element or member with electric current conductors.

In the embodiment of the invention illustrated in the drawing there is provided a metallic shell or housing 12 of tubular form having the internal diameter reduced at one end portion by an annular member or bushing 13 secured therein, as by sweating, or in any other suitable manner, with the outer end of the bushing projecting from the shell. The opposite end of the shell is closed by a cap 14 having a central opening or perforation and releasably secured to the shell by a pair of opposed nibs pressed inwardly from the material of the skirt of the closure cap engaging bayonet joint shaped slots extended into the end of the shell, as shown at 15 in Figure 1.

The shell 12 is adapted to carry a soldering bit 16 of copper or a copper alloy having a taper tip portion and a base portion of larger diameter than the opening in the bushing 13, and said bit being arranged integral with and at one end of a shank 17 of slightly less diameter than the opening in the bushing 13 and of less length than the length of the shell, as clearly shown in Figure 1. The soldering bit and shank is supported and releasably retained in the shell bushing 13 by a set screw 18' threaded into alined screw threaded openings in the shell 12 and bushing 13.

The soldering bit is heated to soldering temperature through the shank 17 by an electric heating unit capable of generating sufficient heat to maintain the shank at a sufficiently high temperature to assure transmitting the heat thereof to and heating the bit to an effective and continuous soldering temperature. This is accomplished by providing the heating unit with an electric resistor element or member consisting of a coil of resistance wire of maximum length in proportion to the size of said heating unit.

The heating unit comprises a circular body or carrier of electric resistance and thermal conducting material, such as porcelain or other ceramic material, embodying a pair of endwise abutting sections 18, 19 (Figures 4 to 8), the section 18 having an axial bore 20 extended therethrough and the section 19 having an axial bore 21 extended into the end abutting the other section 18 and closed at the opposite end, as at 22. The bores 20, 21 are of the same diameter and substantially of a diameter the same as the opening in the bushing 13 and the bit shank. The sections 18, 19 are secured together in endwise abutting relation to constitute a unitary structure as hereinafter described. The section 18 of the resistor carrying body has an annular recess 23 in the free end and a series of circumferentially spaced passages or bores 24, in the present instance eighteen in number, extending longitudinally through the wall of said body section with the one end of the passages opening to the recess 23, as shown in Figure 9, and the opposite end of said passages opening through the opposite end of said section. The section 19 has a recess 25 centrally in the outer surface of the closed end and an arcuate recess 26 concentric of and with the ends opening to the central recess 25 at opposite sides of a rib 27 extending transversely of said recess, as shown in Figure 6. The other body section 19 also has a series of circumferentially spaced passages 29 extended longitudinally therethrough equal in number to the passages 24 in the body section 18. The passages 29 open through the opposite ends of the body section 19 with one end in communication with the recess 26 and are alined with the passages 24 in the body section 18 when the two sections are in abutting relation.

The resistor element or member consists of a helically wound wire of any suitable electric resistance material 28 engaging and carried in the passages 24, 29 of the respective body sections. To mount the resistor element 28 in the passages 24, 29 in the body sections one end of the resistor element is entered into a passage 29 in the body section 19 at one side of the rib 27 and then threaded or extended through a passage 24 in the body section 18 alined with said passage 29 in the body section 19. The resistor is then threaded or extended through the successive passages 24, 29 in the body sections with portions between the portions engaging in adjacent passages 24 in body section 18 extended over or about the end of the separating wall between the passages, as at 30, and said portions of the resistor member disposed in the recess 23. The portions between the portions of the resistor member engaging in adjacent passages 29 in the body section 19 are extended about the end of the separating walls between said passages 29, as at 31, and said portions of the resistor member disposed in the arcuate recess 26 in the outer surface of the closed end of the body section 19 with the terminals of the resistor member extending through the passages 29 in the body section 19 at opposite sides of the rib 27, as shown at 32 in Figure 3, to be disposed relative to the portion of the central recess 25 at opposite sides of said rib 27, and connected in electrical connection with conductors 33 by extending the terminal portion of said conductors into a terminal portion of the coil of the resistor member and secured therein by a V-shaped conductor member 34 (Figure 11) engaged over and clamped to said interengaged terminal portions of the resistor member and conductors as shown in Figures 2 and 6, and said connected portions disposed in the central recess 25 in the closed end of the body section 19. The threading or engaging of the resistor member in the passages 24, 29 in the body sections 18, 19 draws said sections together into abutting relation. To secure the body sections in abutting relation the sections are spread apart so that the juxtaposed ends thereof will be spaced from each other, as shown in Figure 4, which is permissible by the spreading of adjacent convolutions of the resistor coil. In said condition of the body sections an electric insulating and thermal conducting material in a plastic state such as a ceramic or refractory material is filled into the space between the ends of the spaced body sections, as shown by stippling in Figure 4, when the body sections are forcibly moved to engage the ends in abutting relation, this movement of the body sections causing surplus portions of such material to enter into the resistor engaging passages 24, 29 in the body sections 18, 19 in embedding relation to the resistor member and anchoring the resistor member therein and a portion of such material disposed between the ends of the body sections acting to cause the body sections to be secured together into a unitary structure, as shown by stippling in Figures 1 and 5. The body sections are maintained in such condition under pressure until the plastic material sets or hardens. In this condition of the heating unit it is engaged into the shell or housing 12 with the free end of the body section 18 abutting the shell bushing 13. Electric and heat insulating material, such as a ceramic or refractory material, is filled in a plastic state into the recess 23 in the end of the body section 18 embedding the portions 30 of the resistor member or coil extended about the end of the walls between the passages in the body section 18 in such material, as shown by stippling at the left hand end of Figure 3. Also such material is filled into the central and arcuate recesses 25, 26 in the outer surface of the end wall of the body section 19 embedding the portions 31 of the resistor member or coil extended about the ends of the separating walls of the passages 29 in the body section 19 and the connected terminals of the resistor member and the conductors, which may be enclosed in beads strung onto the conductors, said material being shown by stippling at the right hand end of Figure 3 and in Figure 2.

The outer diameter of the resistor carrying body 18, 19 is less than the internal diameter of the shell or housing 12 and to support the heating unit therein in spaced relation to the side wall of the shell the body sections are arranged at the outer ends with projections 35, in the present instance four in number, equidistantly spaced about the body and extending outwardly from the body a distance equal to the difference in the radius of the outer diameter of the body and the inner diameter of the shell. As the heating unit is engaged in the shell the projections 35 will have a point contact with the shell and support the heating unit in spaced relation to the shell with the axial bores in the body sections coaxial of the opening in the shell bushing 13 and adapted for engagement of the bit shank, as shown in Figure 1.

To prevent rotary movement of the heating unit in the shell through the connection of the conductors with the terminals of the resistor member or coil the shell bushing 13 is provided with a pair of lips offset from the material thereof at the inner surface, as at 37, said lips being spaced apart a distance slightly greater than the thickness of the projections 35. As the heating unit is engaged into the shell 12 one of the projections 35 of the body section 18 will engage between said pair of ears or lips 37 and as the bushing 13 is secured in the shell 12 it will hold the heating unit against rotation. It will be obvious that the shell bushing 13 may be provided with more than one pair of lips 37.

To hold the heating unit against axial displacement in the shell 12 a member of electric and heat insulating material, such as a ceramic or refractory material, having a disk portion 38 of a diameter equal to the inner diameter of the shell 12 is engaged in the shell at the outer end of the heating unit with an annular portion projecting from the face of the disk portion engaging the end of the heating unit, as shown in Figure 1. Said member has a tubular portion 39 extending axially from the opposite face of the disk portion adapted to extend through the perforation or opening in the closure 14, and said member and the heating unit yieldingly urged in a direction toward the shell bushing 13 by a resilient washer member 40 having peripheral lip portions offset to one side thereof and engaged in the shell between the closure 14 and the member 38.

By arranging the body of the heating unit of less diameter than the shell 12 and providing the same with the projections 35 whereby there is only point contacts between the heating unit and the shell and the heating unit is supported in the shell in spaced relation to the side wall thereof the heat of the heating unit will not be transferred to the shell and radiated by the latter to the atmosphere or a hand grip connected to the shell for carrying and manipulating the soldering iron and thus not only conserving the heat generated by the heating unit but transferring practically all of such heat to the shank of and heating the soldering bit.

Having described my invention, I claim:

1. An electric heating unit comprising a body of electric insulating and thermal conducting material having projections spaced about and extending laterally therefrom adjacent the ends thereof, a bore extended into one end and closed at the opposite end of the body and passages circumferentially spaced about and extending longitudinally through the wall of the body surrounding the bore, and an electric resistance member in said passages, the terminals of which extend from adjacent passages opening through the closed end of the body and are adapted for connection of electric current conductors at said end of the body.

2. An electric heating unit as claimed in claim 1, wherein an annular recess is arranged in the end of the wall of the body disposed about the bore and into which one end of the passages open, the outer surface of the closed end of the body having a central recess, an arcuate recess disposed about and having the opposite ends opening to said central recess and a rib extending transversely of the central recess from a wall portion of said central recess to an opposed wall portion of the arcuate recess, the opposite ends of the passages open to the arcuate recess, and the electric resistance member extending through the successive body passages and about the ends of the passage separating walls in the annular and arcuate recesses in the ends of the body and the terminals of the resistance member and the connected portions thereof and the conductors disposed in the central recess in the closed end of the body at opposite sides of the transverse rib, and an electric and heat insulating ceramic material filled into the recesses in the ends of the body and embedding therein the portions of the resistance member in said recesses and the connected portions of the terminals of the resistance member and the conductors.

3. An electric heating unit as claimed in claim 1, wherein the body consists of endwise abutting sections with the passages therein in alinement and the bore extended through the first section and into the second section arranged with the closed end, the outer end of the first section having an annular recess therein to which one end of the passages open, and the closed end of the second section having an arcuate recess therein to which the passages open and a central recess with a rib extending transversely thereof and the arcuate recess in communication with said central recess at opposite sides of the rib, the electric resistance coil is threaded through the passages in the abutting body sections and disposed about the ends of the walls separating the passages in the annular and arcuate recesses in the body sections with the terminals of the coil extended through the passages at opposite sides of the rib at the closed end of the second body section, the connections between the terminals of the electric resistance member and electric conductors are disposed in the central recess at opposite sides of the rib at the closed end of the one body section, and electric and heat insulating ceramic material is filled into the recesses in the ends of the body sections for embedding the portions of the coil and connections of the coil terminals with the conductors in said recesses disposed between and in the passages adjacent the abutting ends of the body sections for securing the body sections together and embedding portions of the coil in the passages.

4. An electric heating unit comprising an annular body of electric insulating and thermal conducting material closed at one end, said body having passages circumferentially spaced about the annular wall and extending longitudinally therethrough, an electric resistor member passed through the successive passages and about the ends of the walls between the passages, with the terminals of the resistor member extending through adjacent passages at the closed end of the body adapted for connection of electric conductors, and the portions of the resistor member at the ends of the body and the connections of the terminals thereof with the conductors being embedded in a refractory material.

5. An electric heating unit as claimed in claim 4, wherein the body of electric resistance and thermal conducting material consists of tubular sections, with the bore in one section closed at one end and the open end of said section abutting an end of the other section, and a refractory material disposed between and securing the body sections together at the abutting ends.

BENJAMIN P. McKINLEY.

REFERENCES CITED

The following references are of record in the file of this patent:

UNITED STATES PATENTS

| Number | Name | Date |
| --- | --- | --- |
| 1,026,377 | Barringer | May 14, 1912 |
| 1,533,230 | Colby | Apr. 15, 1925 |
| 1,715,287 | Head | May 28, 1929 |
| 2,041,018 | Persons | May 19, 1936 |
| 2,064,645 | Abbott | Dec. 15, 1936 |
| 2,159,041 | Moulthrop | May 23, 1939 |